UNITED STATES PATENT OFFICE.

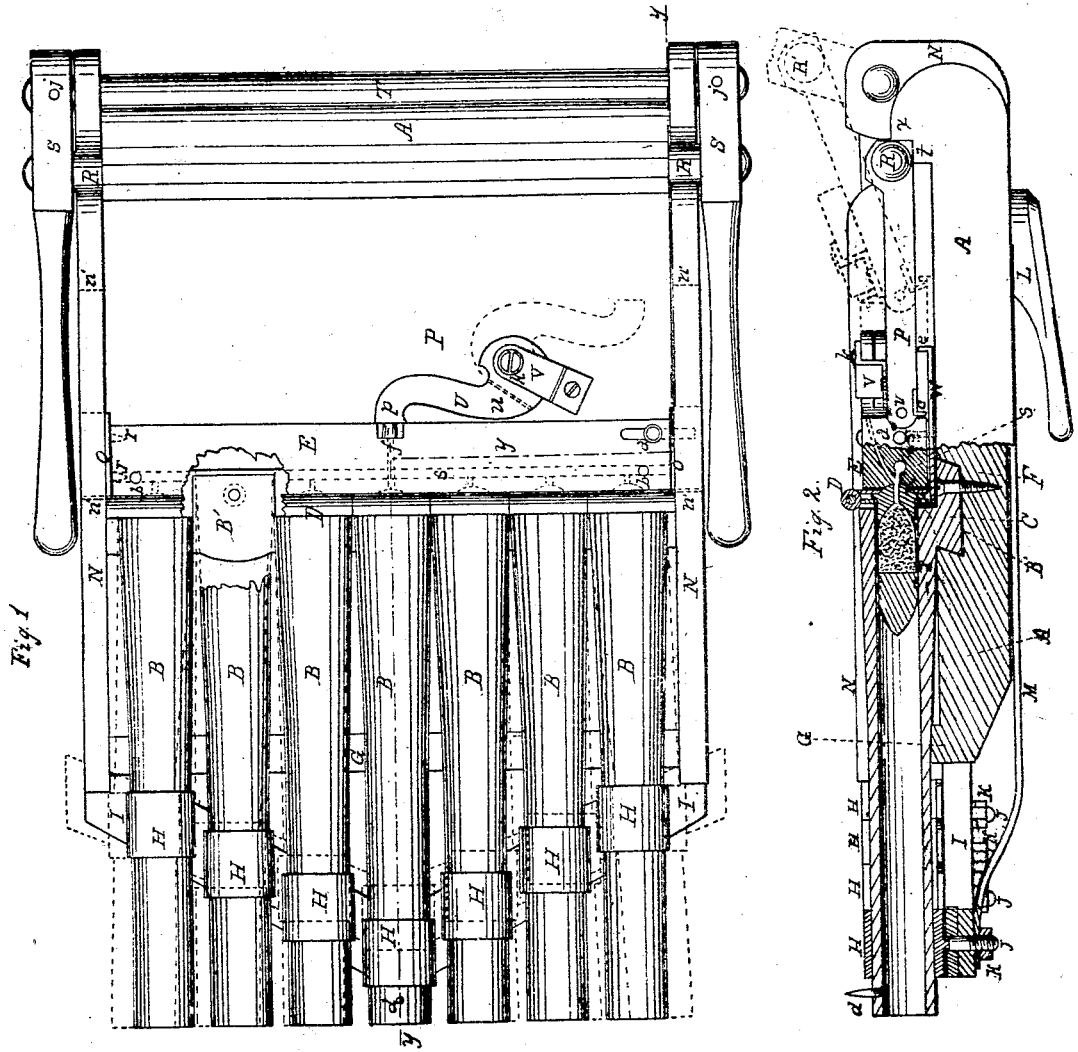

WM. BILLINGHURST AND J. REQUA, OF ROCHESTER, NEW YORK.

IMPROVEMENT IN PLATOON-BATTERIES.

Specification forming part of Letters Patent No. 36,448, dated September 16, 1862.

*To all whom it may concern:*

Be it known that we, WM. BILLINGHURST and J. REQUA, of Rochester, in the county of Monroe and State of New York, have invented a new and useful Rifle-Battery; and we do hereby declare that the following is a full, clear, and exact description thereof, reference being had to the accompanying drawings, making a part of this specification, in which—

Figure 1 is a plan or top view of the invention. Fig. 2 is a vertical section taken through the parts in the direction of the red line *y* in Fig. 1. Fig. 3 is a rear elevation of the cartridge holder or clamp, shown open and containing the cartridges. Fig. 4 is a longitudinal central section of the cartridge-cases, full size.

Similar letters of reference indicate corresponding parts in all the figures.

The nature of this invention will be understood by reference to the drawings and specification, and its construction and operation are as follows:

The bed A is of iron, and may be of skeleton form. There is a recess, B', made in the upper face of the bed transversely, to receive the pivot-shank or projection C of the barrels B. This recess is enlarged on the front side circularly under each barrel, as seen in Fig. 1, a portion of one barrel, the clamp D, and of the bar E being broken away for that purpose. Each barrel is pivoted to the stock A by a screw or bolt, F, passing through the shank C. The center barrel of the series is fixed to the rest G by a screw or otherwise.

The rings H are made to slide, except the two encircling the outer barrels, which are fixed thereto. They are all pivoted to the bars I, (by threaded shanks J and nuts K,) which are placed diagonally under the barrels, as seen in Fig. 1, and are halved together, forming a hinged joint under the center barrel, where they are connected to the rod M, and by that to the lever L. The barrels B are radiated, as shown by the red dotted lines in Fig. 1, by moving the said lever L toward the rear of the battery, and vice versa.

The breech-bar E is made from a solid bar, and is entirely detached from the barrels and also from the cartridges. There is a hole, *s*, drilled through it longitudinally, as indicated by the dotted lines in Fig. 1, and branches leading therefrom to the centers of the countersinks opposite each barrel, which receive the spherical heads *h* of the cartridge-cases, and one from the cone *f* intersecting the branch opposite. This bar is countersunk at the mouth of each branch to fit the spherical form of the heads *h*, as shown in Fig. 2 and by the dotted lines in Fig. 1. The ends of the hole or tube *s* are closed by the transverse pins *b*.

The flame passes from the cone F to the cartridge opposite, and from that back into the tube *s*, and, communicating through all the other branches, produces a simultaneous discharge.

There is a movable head, O, hinged to the plate P on both sides, and they slide in a slot (indicated by the dotted lines *n'*) made through the sides N for that purpose. The breech-bar E is connected to one head by two dowels, *r*, and to the other by the sliding bolt *a*, which allows the bar to be removed at any time, and in case of a forced abandonment it should be taken away, thus rendering the battery entirely useless to its captors.

The plate P is hinged to each of the heads O by a pivot or screw, *v*, (seen in Fig. 2,) and it is provided with a lip, *c*, to catch the lip *e* of the plate W, and the rear corners are provided with journals R, that reach through the levers S. The latter are fixed to the roller T (which constitutes their fulcrum) by the pins *j*. The rear edge of the plate P drops in front of the heavy clutch *x* on the bed A, as seen in Fig. 2, and it thereby constitutes a solid backing to the breech-bar E, and when it is operated it affords an automatic adjustment to the hammer U, as hereinafter shown. The center of the journals R drops below that of the roller T before the plate strikes the ledge *t*, so that the levers S act as diagonal braces to keep the plate P in its proper position during the discharge.

The hammer U is pivoted to the plate P by means of the screw *k*, which passes through the bracket V, and eccentrically through the cam-shaped portion of the hammer into the plate; and as the rear edge of the plate is raised by the movement of the levers the head *p* of the hammer is thrown back from the cone toward the position shown by the dotted lines in Fig. 1, by the upper corner of the bar E striking the cam-face $u$ of the hammer to the right of the line of its axis, the latter being so arranged as to cause the said cam-face to just touch the bar E when the head $p$ is against the cone $f$, and by this construction and relative arrangement of the hammer with the breech-bar the possibility of a premature discharge of the battery is entirely prevented, because the head $p$ cannot touch the cap until the backing-plate P is down to its place. The hammer is operated by a lanyard in the ordinary way.

There is a thin metallic rack or guide, W, Figs. 2 and 3, placed between the sliding or breech bar E and the bed A. The front and rear edges are turned up, as seen in Fig. 2, and the distance between the two lips should be equal to about one-half the length of the cartridge-cases added to the width of the bar E. By making the guide of such a length it only traverses about half as far as the bar E, which leaves the scalloped rest about midway between the end of the barrels and the bar when the latter is withdrawn. The front lip is scalloped, as shown by the dotted lines in Fig. 3, the number of scallops corresponding to the number of cartridges. The latter are guided by the said rack or guide W, each into its respective chamber or barrel, and it also serves to withdraw the empty cases.

The cartridge holder or clamp D is composed of two wings, also made of thin sheet-iron, and hinged together. The openings $l$ through the wings are made to receive the cases $g$ of the cartridges, but not to admit the flange $m$, which is clasped between the wings of the clamp when closed, whereby they may be moved about, as when being transferred from the caisson to the battery, &c., without danger of being misplaced or lost out.

The cartridge-cases are composed of a thin metallic cylinder, $g$. (Shown full size in Fig. 4.) One end is closed by a solid metallic head, $h$, the outside of which is made spherical to allow the barrels B to radiate without impairing the joint between the cartridge-head and the bar E, which is a very important feature. The head $h$ is encircled by a projecting flange, $m$. The cylindrical portion of the head is made to fit snugly into the case $g$, and is bored out about in form of a parabola, thus leaving an exceedingly thin yielding edge, which insures a perfectly tight joint between the cylinder of the head $h$ and the case $g$. The heads may be soldered in.

The object of making the head so heavy is to give proper strength to that portion of the cartridge-case necessarily intervening between the end of the barrels B and the breech-bar E, which space is occupied by the clamp D and the scalloped rest or guide W. These cases may be loaded with patched bullets, and a wad also, if desired, saturated with grease, which allows any number of discharges without stopping to clean the barrels.

A quantity of holders or clamps, D, are supplied with charged cartridges and placed in suitable caissons for transportation. There is a sight, $d$, fixed to the center barrel, and there may be another attached to the rear of the bed A in the center. The whole battery is designed to be placed upon a light field-carriage, and to be provided with an elevating-screw, similar to ordnance.

Summary of the operation: The levers S are thrown back, placing the plate P in the position indicated by the dotted lines in Fig. 2, which also removes the breech-bar E to its rear position. A clamp containing the cartridges is then placed between the breech-bar and the barrels and the levers S thrown forward, which forces the cartridges into their respective chambers. Either of these movements—that is, forward and back—of the plate P would force the hammer U away from the cone, so that the cap may be placed upon it without any further preparatory adjustment of the hammer. After the discharge the levers S are again thrown back, which withdraws the empty cartridge-cases, when they may be removed and another set supplied, as before.

We are aware it is not new, in the employment of two or more separate barrels, to diverge or converge them by means of wedges, screws, or toggle-joints operated by a sliding bar; but

What we claim as new, and desire to secure by Letters Patent, is—

1. The combination of the barrels B, operated as described, with the cartridges $g$ and breech-bar E.

2. The employment of the cartridge holder or clamp D, constructed substantially in the manner and for the purpose set forth.

3. The employment or use of the rest or guide W, constructed and operating substantially in the manner and for the purposes specified.

4. The employment of the breech-bar E, in combination with the backing-plate P, when they are arranged and operated so as to automatically throw the hammer U back.

WM. BILLINGHURST.
JOSEPHUS REQUA.

Witnesses:
WM. S. LOUGHBOROUGH,
JOHN L. REQUA.